No. 749,777. PATENTED JAN. 19, 1904.
F. W. DALLINGER.
APPARATUS FOR MAKING COFFEE OR THE LIKE.
APPLICATION FILED JAN. 12, 1903.
NO MODEL.
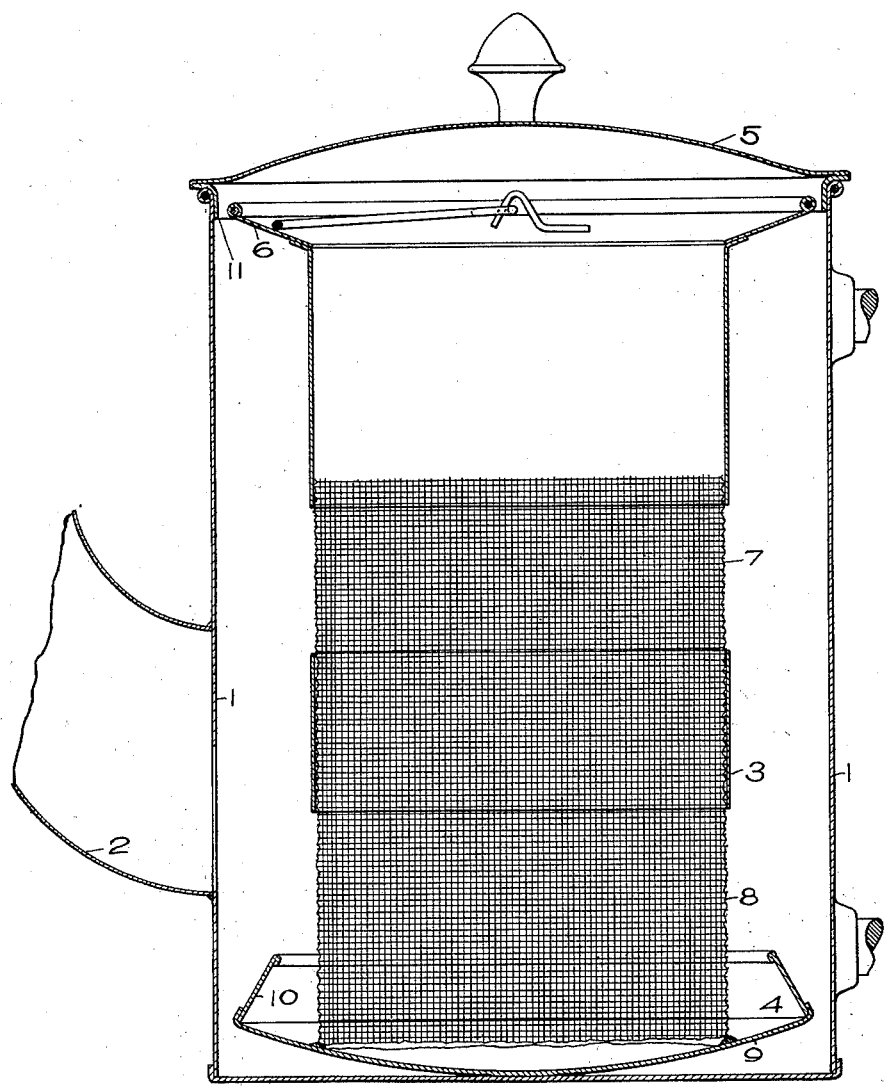
WITNESSES
INVENTOR
Frank W. Dallinger
by his Attorneys
Phillips Van Everen & Fish No. 749,777. Patented January 19, 1904.

UNITED STATES PATENT OFFICE.

FRANK W. DALLINGER, OF CAMBRIDGE, MASSACHUSETTS.

APPARATUS FOR MAKING COFFEE OR THE LIKE.

SPECIFICATION forming part of Letters Patent No. 749,777, dated January 19, 1904.

Application filed January 12, 1903. Serial No. 138,630. (No model.)

*To all whom it may concern:*

Be it known that I, FRANK W. DALLINGER, a citizen of the United States, residing at Cambridge, in the county of Middlesex and State of Massachusetts, have invented certain new and useful Improvements in Apparatus for Making Coffee or the Like; and I do hereby declare the following to be a full, clear, and exact description of the invention, such as will enable others skilled in the art to which it appertains to make and use the same.

The present invention relates to an improved apparatus for making coffee or the like.

The object of the invention is to produce an apparatus of simplified form in which decoctions of coffee or other substances can be made in a rapid and effective manner.

To the above end the invention consists in the improved apparatus hereinafter described and claimed.

The present invention relates more particularly to coffee-pots in which the coffee or other material is inclosed in an inner perforated receptacle which prevents diffusion of the grounds in the decoction, thereby rendering the use of settling material unnecessary, while permitting the water to circulate freely through the grounds, such as shown in my Patent No. 699,494, May 6, 1902. Apparatus of this character heretofore proposed has been defective, owing to the fact that if the perforations in the coffee-holder are made large enough to permit free circulation of liquid the finer grounds will escape therethrough and mingle with the decoction. A feature of the present invention is the provision of an annular receptacle attached to the coffee-holder for arresting such grounds as escape in this manner. Furthermore, the operation of this device is aided by the provision of means by which the currents of liquid in the apparatus are so directed that the grounds escaping in the above-described manner will be carried toward the annular receptacle.

Other features of the invention will be apparent from the following description.

The accompanying drawing represents in vertical section an embodiment of the present invention comprising a decoction-chamber 1, which may be provided with a spout 2 for drawing off the contents, a coffee-holder 3, the bottom of which is provided with an upward extension 10, forming an annular receptacle 4, and a cover 5 for closing the chamber 1. Fixed to the top of the coffee-holder is a flange 6, which maintains it upright. This flange is preferably funnel-shaped to aid in pouring water into the coffee-holder. The coffee-holder is provided near its bottom with separated bands of perforations conveniently consisting of zones of wire-gauze 7 and 8, which are interposed between the imperforate portions of the coffee-holder, as shown in the drawing. An upturned annular member is secured to the coffee-holder below the lower band of perforations to form an annular receptacle 4 for grounds. This member is formed in the illustrated embodiment of the invention by an integral extension of the piece 9, which forms also the bottom of the coffee-holder, and an upwardly and inwardly extended flange or lip 10. The bottom 9 of the coffee-holder and of the annular receptacle is convex to permit the escape of steam from between the coffee-holder and the bottom of the decoction-chamber. The coffee-holder extends nearly to the top of the decoction-chamber, and the cover 5 has a depending portion 11, which surrounds the upper end of the coffee-holder.

The operation of the above-described apparatus is as follows: The coffee-holder is filled with coffee or other material above the height of the uppermost zone of wire-gauze. Boiling water is poured into the coffee-holder and allowed to permeate the grounds and emerge through the gauze into the decoction-chamber. The water may then be poured into another vessel and again poured into the coffee-holder and the operation repeated. The cover is then put in place and the apparatus is set on a stove and the water therein boiled for a sufficient length of time. The steam formed in the space between the bottom of the decoction-chamber and the convex bottom of the coffee-holder will emerge between the latter and the sides of the chamber, and the water will be caused thereby to flow in an ascending current adjacent to the walls of the decoction-chamber and to descend near the walls of the coffee-holder, and the descending current will carry any grounds which escape from the holder into the annular receptacle, where they will remain undisturbed. When the boiling is completed, the coffee-holder may be removed, if desired, leaving only the clear decoction in the chamber. During the boiling the liquid permeating the grounds being cooler and more concentrated will be heavier than the boiling liquid outside of the coffee-boiler and will slowly descend, thereby causing a current to flow into the upper band of wire-gauze and out of the lower. When the contents of the holder are of a cereal character, such as "Postum," the contents will float near the top of the liquid in the holder or be distributed throughout the same. This latter part of the process may be aptly termed a "circulating leaching process," since the liquid in contact with the grounds is at boiling temperature, but does not boil while in the coffee-holder. If the contents of the apparatus be violently boiled, the liquid will be carried upward by the bubbles of steam and will fall into the conical top of the coffee-holder and upon the grounds therein, so that the action of the apparatus will be facilitated thereby. The convexity of the bottom of the holder not only permits escape of steam from between the holder and the bottom of the decoction-chamber, but also insures the maintenance of a supply of liquid therebetween, which prevents overheating of the bottom of the decoction-chamber and also prevents the boiling of the liquid in the coffee-holder.

It is to be noted that the annular receptacle 4 as arranged with relation to the coffee-holder retains such portion of the liquid as has been longest in engagement with the coffee-grounds and which may therefore contain caffein or tannic acid, so that the same is not diffused throughout the decoction-chamber or mixed with the decoction produced by the apparatus. Furthermore, it is to be noted that by making the annular receptacle 4 with the inturned lip 10 the necessity for the removal of the coffee-holder when the apparatus is used after the coffee has been made is not imperative, because when the pot as a whole is tipped to empty its contents the objectionable portion of the decoction, together with any coffee-grounds or sediment—that is, the portion in the bottom of the coffee-holder—is retained by such inturned flange and prevented from being poured out with the rest of the decoction.

One of the great difficulties in the preparation of cereal-coffee substitutes has been to produce a decoction free from grounds, and the feature of the present invention, which consists in providing the coffee-holder with an outwardly-extended flange at its upper end, which is received within the depending portion 11 of the lid, assists materially in preventing by any possibility the mixing of the grounds in the coffee-holder with the decoction outside.

While the present invention may be used for making decoctions of many vegetable substances, it is particularly useful for making cereal-coffee substitutes and for treating coarsely-ground coffee. It is not intended, however, to limit the invention to such purposes nor to the specific construction shown and described.

Having thus shown and described the nature of my invention, I claim as new and desire to secure by Letters Patent—

1. An apparatus for making coffee or the like, having, in combination, a decoction-chamber, a perforated coffee-holder inclosed therein, and an annular imperforate upturned extension fixed to the coffee-holder below the perforation, substantially as described.

2. An apparatus for making coffee or the like, having, in combination, a decoction-chamber, a perforated coffee-holder inclosed therein, and an annular imperforate receptacle fixed to the bottom of the coffee-holder, the bottom of the coffee-holder and the receptacle being of slightly less diameter than the decoction-chamber so as to direct outwardly the ascending currents in the chamber, substantially as described.

3. An apparatus for making coffee or the like, having, in combination, a decoction-chamber, a perforated cylinder of less diameter inclosed therein, and an imperforate downwardly-convex member closing the bottom of the cylinder, and extending to nearly the diameter of the decoction-chamber, the outer portion of the said member being retracted to form an annular receptacle between the perforated cylinder and the walls of the decoction-chamber, substantially as described.

4. An apparatus for making coffee or the like, having, in combination, a decoction-chamber, a perforated coffee-holder of less diameter inclosed therein, and an annular receptacle fixed to the coffee-holder below the perforations therein, the coffee-holder having an imperforate convex bottom and the annular receptacle comprising an integral extension from the same and an upwardly and inwardly directed flange fixed thereto, substantially as described.

In testimony whereof I affix my signature in presence of two witnesses.

FRANK W. DALLINGER.

Witnesses:
   HORACE VAN EVEREN,
   FARNUM F. DORSEY.